(12) United States Patent
Hunker

(10) Patent No.: US 6,325,442 B1
(45) Date of Patent: Dec. 4, 2001

(54) SUPPLEMENTAL SUN SHIELD FOR A FRONT WINDSHIELD VISOR

(76) Inventor: Richard E. Hunker, 6348 Blueberry La., Englewood, FL (US) 34224

( * ) Notice: Subject to any disclaimer, the term of this patent is extended or adjusted under 35 U.S.C. 154(b) by 0 days.

(21) Appl. No.: 09/729,153

(22) Filed: Dec. 4, 2000

(51) Int. Cl.[7] ...................................................... B60J 3/00
(52) U.S. Cl. ..................... 296/97.6; 296/97.1; 296/97.2
(58) Field of Search .................................. 296/97.1, 97.2, 296/97.5, 97.6, 97.7, 97.9, 97.11

(56) References Cited

U.S. PATENT DOCUMENTS

| | | | | |
|---|---|---|---|---|
| 3,158,396 | * | 11/1964 | Berger ................................. | 296/97.6 |
| 3,415,569 | * | 12/1968 | Leevo ................................. | 296/97.6 |
| 5,259,657 | * | 11/1993 | Arendt et al. ....................... | 296/97.6 |

FOREIGN PATENT DOCUMENTS

| | | | | |
|---|---|---|---|---|
| 2632255 | * | 12/1989 | (FR) ................................. | 296/97.6 |
| 002662119-A | * | 11/1991 | (FR) ................................. | 296/97.6 |
| 002676403- | | | | |
| A1 | * | 11/1992 | (FR) ................................. | 296/97.6 |

* cited by examiner

Primary Examiner—Stephen T. Gordon
Assistant Examiner—Lori L Coletta
(74) Attorney, Agent, or Firm—Charles R. Wilson

(57) ABSTRACT

A supplemental sun shield for use on a motor vehicle's windshield visor effectively blocks out sun rays which the visor itself is not capable of blocking. The supplemental sun shield comprises a clip member and a glare reducing polymeric sheet element rotatably mounted on the clip member. The clip member has two elongated legs joined at lower terminuses. A front elongated leg has a hook-like arm extending from a front face. The glare reducing polymeric sheet element is generally rectangular-shaped with a slot in an upper area. The slot is shaped to fit over the hook-like arm of the clip member. The sheet element can be moved laterally as needed. The supplemental sun shield can also be moved laterally on the windshield visor as needed by moving the clip member with its attendant glare reducing polymeric sheet element. Further, the sheet element can be radially rotated on the clip member to an angle as needed depending on the driver's seat height and sun's position in the sky.

21 Claims, 4 Drawing Sheets

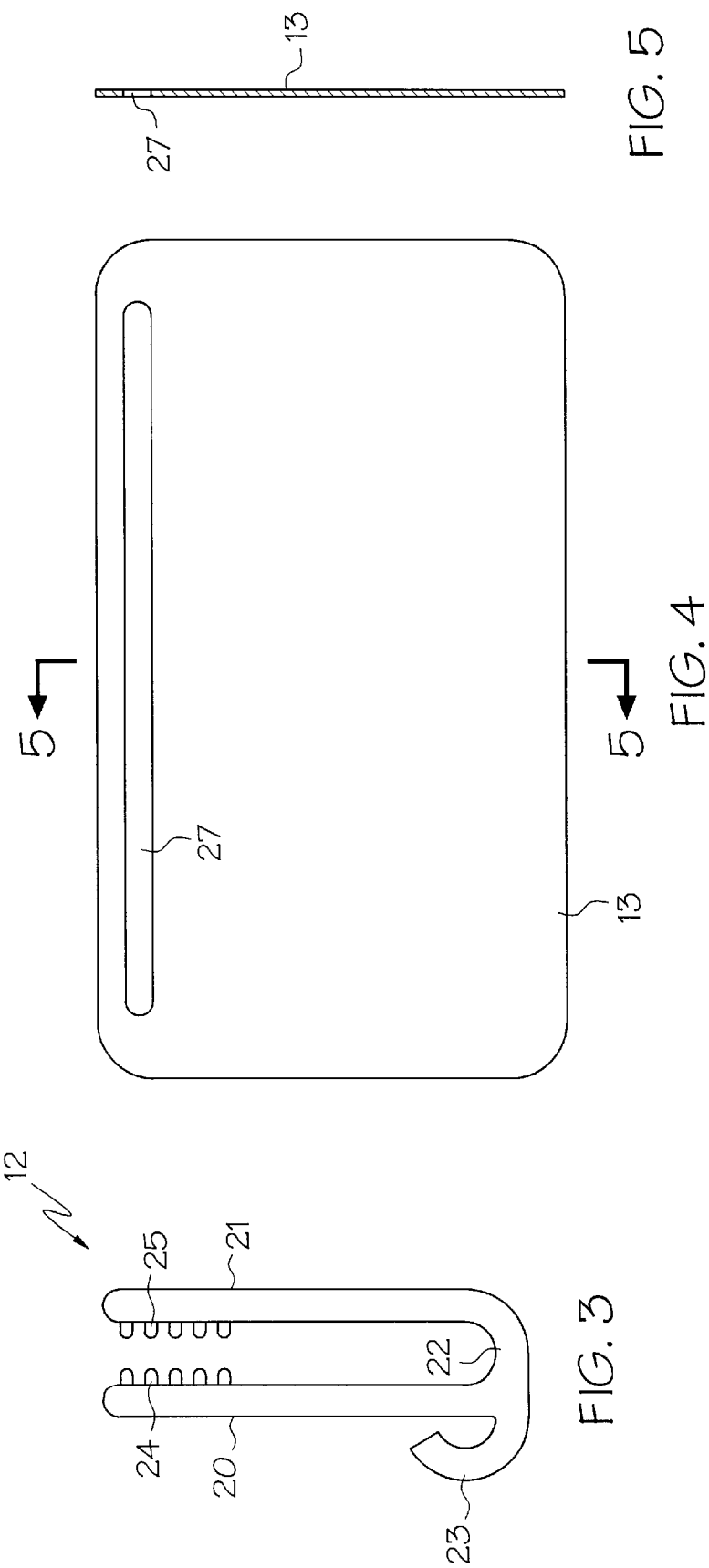

SUPPLEMENTAL SUN SHIELD FOR A FRONT WINDSHIELD VISOR

FIELD OF THE INVENTION

This invention relates to a supplemental sun shield. More particularly, it relates to an adjustable supplemental sun shield for semi-permanent mounting on a front windshield visor of a motor vehicle.

BACKGROUND OF THE INVENTION

All drivers of motor vehicles can attest to the fact that there are certain times during a day when the vehicle's direction of travel and the sun's position in the sky create a near blinding driving situation. Even at night time, an on-coming vehicle with its bright lights on can cause a blinding effect. All vehicles are equipped with windshield visors for the front windshield. Each visor is simply flipped down from a rest position adjacent the vehicle's roof liner to a position which about parallels the windshield and is near the windshield's top edge. The standard sized visor is dimensioned to leave a substantial amount of front windshield area available for viewing purposes. Most sun problems are readily handled with the vehicle's standard windshield visors.

Certain travel and sun position conditions occur which create a sun glare problem which the standard windshield visors of the motor vehicle are not able to fully eliminate. A larger sized visor would meet the need, though would also interfere with the driver's view of the road. Having to stop at a traffic light and then having to watch the stop light for it to change can be difficult too at times. The standard opaque windshield visor is of no value in these situations. The sun glare problem is very prevalent, experienced by all drivers at least occasionally and by some drivers on an almost daily basis. Numerous attempts have been made to produce a product which attaches to the windshield visor to solve what has proved to be a longstanding problem. U.S. Pat. Nos. 3,304,118, 3,545,805, 3,954,297, 4,167,287, 4,317,589, 4,635,995, 5,611,591, 5,673,957, 5,678,880, and 6,012,758 contain disclosures of several product attempts. There are only a few characteristics which a successful supplemental sun shield product must possess. It must be universally adaptable for use on all or at least most all motor vehicle models. The product must be easily accessed by the driver and readily adjusted to the particular condition. The product also must be inexpensive. To date, no product intended for use in blocking out sun glare in the motor vehicle has been developed which truly has all the aforementioned characteristics.

In accord with a long felt and widely recognized need, there has now been developed a supplemental sun shield for use in a motor vehicle. The supplemental sun shield is conducive to mass production with low manufacturing costs. The supplemental sun shield is readily positioned on the motor vehicle's windshield visor. It is also readily adjusted to a use position as needed. The supplemental sun shield of the invention is adaptable for installation on most vehicle models and is beneficial to drivers of all normal heights.

SUMMARY OF THE INVENTION

A supplemental sun shield comprises a clip member and a glare reducing polymeric sheet element rotatably and slidably mounted on the clip member. The clip member is for mounting on the auto vehicle's windshield visor in a manner where it can move laterally depending on the need. The clip member has two elongated legs, each having an upper terminus and a lower terminus. The legs are joined together at their lower terminuses to form a generally U-shaped configuration. A hook-like arm for the sheet element extends from a front face of one of the elongated legs. The clip member further has a gripper means for gripping the windshield visor. The glare reducing polymeric sheet element has a substantially horizontal slot near an upper edge. The slot of the sheet element fits over the hook-like arm of the clip member. When needed, the glare reducing polymeric sheet element is capable of being radially rotated about the hook-like arm and laterally slid over the hook-like arm of the clip member until the sheet element reaches a position where sun glare is blocked.

BRIEF DESCRIPTION OF THE DRAWINGS

FIG. 3 is a side elevational view of a clip member of the supplemental sun shield of FIG. 2.

FIG. 4 is a front elevational view of a glare reducing polymeric sheet element of the supplemental sun shield of FIG. 2.

FIG. 5 is a sectional view of the glare reducing polymeric sheet element of FIG. 4 taken along line 5—5 thereof.

DESCRIPTION OF THE INVENTION

The supplemental sun shield of the invention is intended for use in motor vehicles of all types, including automobiles, vans, SUV's, pick-up trucks, and transport trucks. The supplemental sun shield L,: is mounted at least on the motor vehicle's driver-side windshield visor, though can be also mounted on the motor vehicle's passenger-side windshield visor as well.

Figure 1:
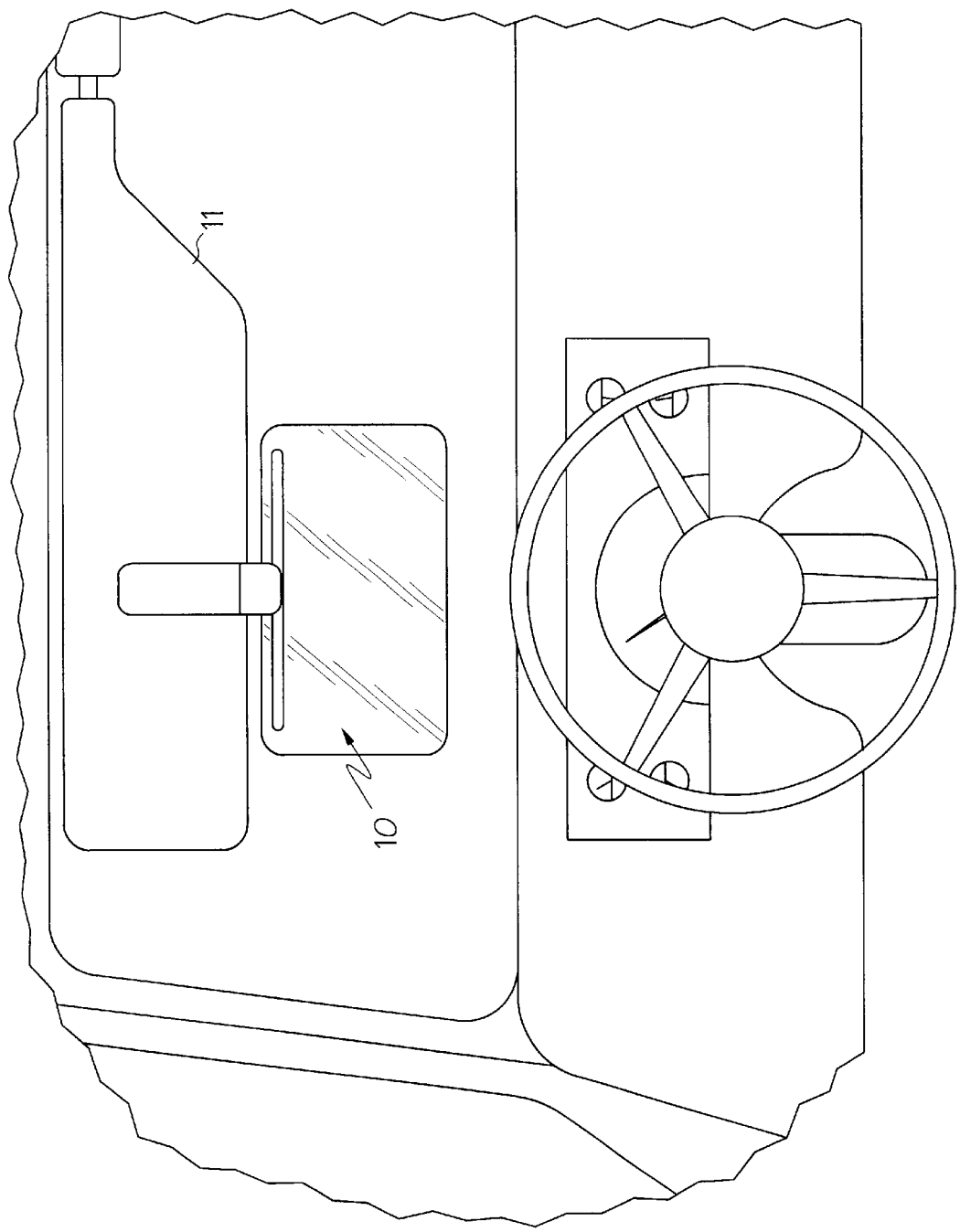
FIG. 1 is an environmental view showing the supplemental sun shield of the invention mounted on the windshield visor of a motor vehicle.
Figure 2:
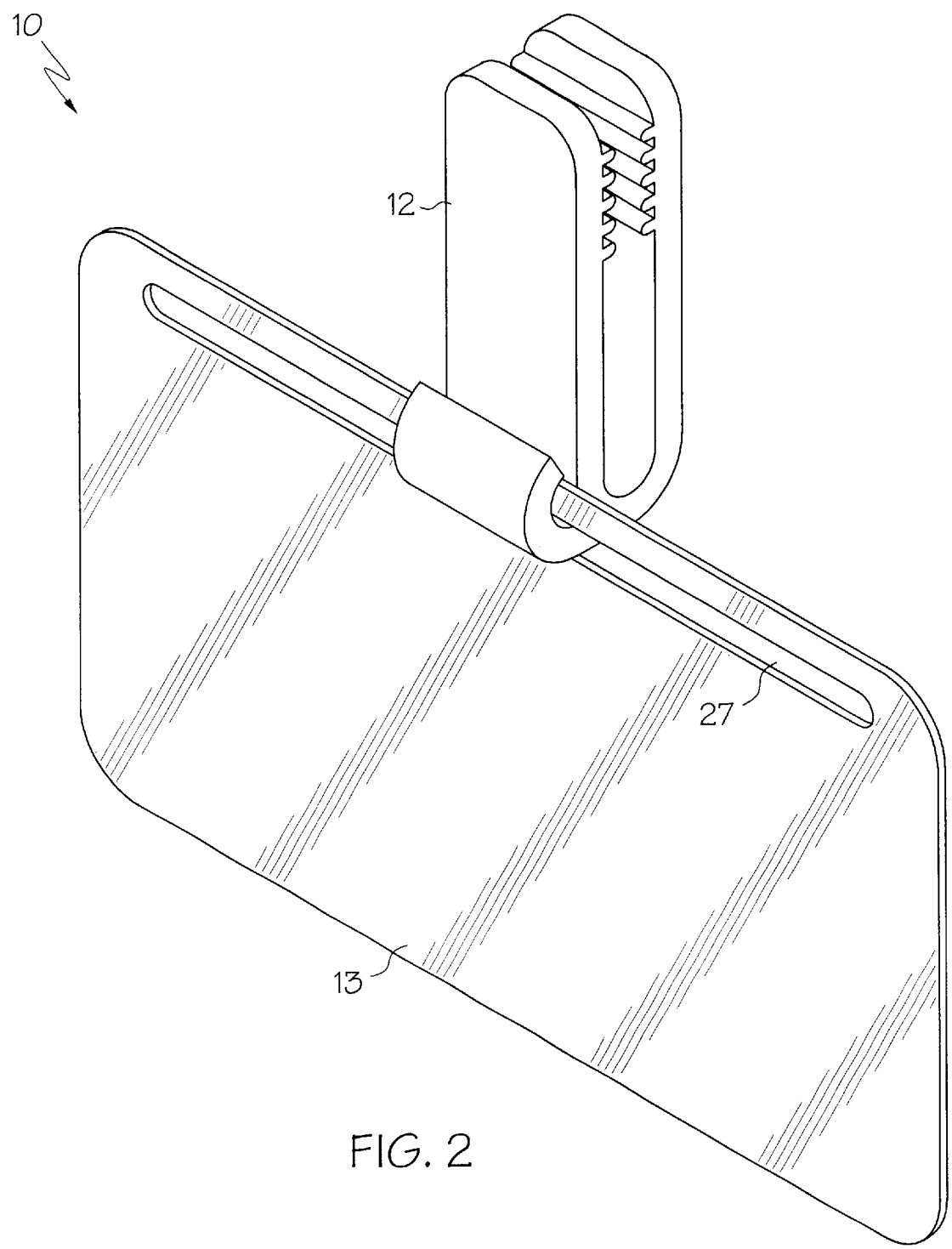
FIG. 2 is a perspective view of the supplemental sun shield of FIG. 1.

With reference to FIG. 1, the supplemental sun shield 10 of the invention is mounted on a driver's windshield visor 11 of a motor vehicle. As best seen in FIG. 2, the supplemental sun shield 10 comprises a clip member 12 and a glare reducing polymeric sheet element 13. Each of the components of the supplemental sun shield is described in detail in the following paragraphs and with particular references to the drawings. A manner of use of the supplemental sun shield is also described.

The clip member 12 of the supplemental sun shield 10 is best seen in FIGS. 2 and 3. The clip member 12 is for semi-permanently mounting to the motor vehicle's windshield visor and for holding the glare reducing polymeric sheet element 13 in a manner which allows position adjustability to block out sun rays. In accord with this invention, the sheet element of the supplemental sun shield can be adjusted in three ways. The vertical position of the glare reducing sheet element can be adjusted by rotating it about the clip member from a position flush with the sun visor to a fully extended position about 180 degrees from the flush position (as seen in FIG. 1). The lateral position of the sheet element can be adjusted in two ways. First, the clip member with its attendant sheet element can be moved laterally on the sun visor. Second, the sheet element itself can be slid to a limited extent along the hook-like arm of the clip member.

A front elongated leg 20 and a back elongated leg 21 of the clip member 12 are joined at their lower terminuses by a connecting leg 22. The resultant clip member has a generally U-shape configuration when viewed from the side as seen in FIG. 3. As should be apparent, the clip member's configuration allows a free end of the clip member to be forced onto the motor vehicle's windshield visor, normally until the top of the connecting leg contacts a lower edge of the visor. Each elongated leg 20 and 21, ranges from about two inches to about four inches. The connecting leg 22 holds the elongated legs 20 and 21 at a spaced relationship approximately equal to or slightly less than the thickness of the vehicle's windshield visor, i.e. from about 0.25 inches to about 0.50 inches.

A hook-like arm 23 extends from the front elongated leg 20. It can extend from the elongated leg 20 anywhere along its front face, though preferably extends from a lower terminus of the elongated leg as shown. It is preferably curved back towards the elongated leg with a narrow opening between its terminus and the front face of the front elongated leg 20. Further, a distance between the inside face of the hook-like arm and an outside face of the front elongated leg at its maximum point is at least about 0.25 inches to properly receive the sheet element slot. The opening must be sufficiently large to allow the sheet element 13 to slip over it at an upper edge and into a slot in the sheet element as further described below. The hook-like arm 23 must have a thickness sufficient enough to give it the strength needed to hold the sheet element and withstand forces exerted on the sheet element during use, yet be less than the width of the slot. Preferably, the hook-like arm is about 0.005 inches to about 0.30 inches thick to readily receive the sheet element and has a width of at least about 0.75 inches to provide a proper degree of sheet element stability when used.

At least one elongated leg of the clip member has a gripper means to aid in holding the clip member 12 to the windshield visor. As evident in FIG. 3, the gripper means is a set of substantially horizontally extending ridges on an inside face of at least one of the elongated legs. As shown, a set of substantially horizontally extending ridges 24 are on the inside face of the front elongated leg 20 and a set of substantially horizontally extending ridges 25 are on the inside face of the back elongated leg 21. The ridges extend substantially across the elongated legs. The ridges grab the surfaces of the windshield visor and are held there by friction engagement. Other gripper means can be used to aid in holding the clip member to the windshield visor and are described below with reference to FIGS. 6–8.

Again with reference to FIGS. 2 and 3, the elongated legs 20 and 21 of the clip member 12 are capable of being flexed outwardly to initially position the clip member onto the windshield visor and then, upon release of a spreading force, resume their natural position. There is sufficient resiliency in the clip member to accommodate different thicknesses of windshield visors and to accommodate a mirror or other object oftentimes built into a windshield visor by the vehicle's manufacturer. A friction fit onto the vehicle's windshield visor, as aided by the horizontally extending ridges, acts to semi-permanently hold the clip member in place. The holding power of the clip member is adequate to withstand normal bumps and vibrations encountered on the road.

The clip member 12 is preferably made of a polymeric material in an injection molding operation for cost reasons. It can also be made of other materials such as a metal and made by other production techniques such as machining.

With reference to FIGS. 4 and 5, the glare reducing polymeric sheet element 13 is flat with a generally rectangular-shape and further has a thin cross section. The sheet element can have other geometric shapes which are conducive to creating a substantial sun glare blocking function. Preferably, the glare reducing polymeric sheet element 13 ranges from about five inches to about ten inches in width and about three inches to about five inches in height. More preferably, the sheet element 13 ranges from about six inches to about nine inches in width and about four inches to about five inches in height. Its thickness is not critical, though for manufacturing ease, economy of raw material cost, and flexibility for installation purposes, it has a thickness of less than about 0.20 inches, preferably from about 0.05 inches to about 0.15 inches.

As best seen in FIGS. 2 and 4, the glare reducing polymeric sheet element 13 has a horizontally disposed slot 27 near an upper horizontal edge area for attachment purposes to the hook-like arm 23 of the clip member 12. The slot 27 is sufficiently wide to fit over the hook-like arm 23 of the clip member 12. The slot 27 extends horizontally across the glare reducing polymeric sheet element 13 and parallels an upper edge with a distance of about 0.25 inch to about 0.50 inch from the upper edge to properly fit over the hook-like arm of the clip member. The slot can extend across the sheet element to near both side edges, though preferably solid edge areas of about 0.50 inches are retained for stability reasons on the clip member during use. Based on the preferred sheet element shape and dimensions above noted, the slot 27 is at least about four inches in length and about 0.10 inch to about 0.40 inch wide. Preferably, the slot 27 is about four inches to about eight inches long and about 0.15 inch to about 0.30 wide.

The sheet element 13 is detachably mounted on the clip member 12, though normally remains on the clip member at all times. When not needed, it can simply be rotated about the hook-like arm of the clip member until it is flat against the vehicle's windshield visor. When needed to block out sun glare, the sheet element is rotated about the hook-like arm until a sheet element angle is reached which blocks out the sun glare, yet permits maximum road view. The slot in the sheet element frictionally engages walls of the hook-like arm 23 such that the sheet element angle is retained once reached.

The glare reducing polymeric sheet element 13 is preferably translucent to allow the vehicle's driver to see through the sheet element for safe driving purposes, though it could be opaque as well. The polymeric sheet element 13 can be made by injection molding a polycarbonate resin to obtain the sheet element or by die cutting the sheet element from sheet goods. The resin used to make the sheet element of the sheet is preferably made glare reducing by tinting with a colorant having any desired color shade such that sun glare is significantly reduced, but objects are still visible through the sheet element.

For rigidity purposes, the glare reducing polymeric sheet element can optionally have a rib extending fully around its perimeter. The rib can be molded into the sheet element. It can as well be a separate element adhered to a flat sheet.

Figure 6:
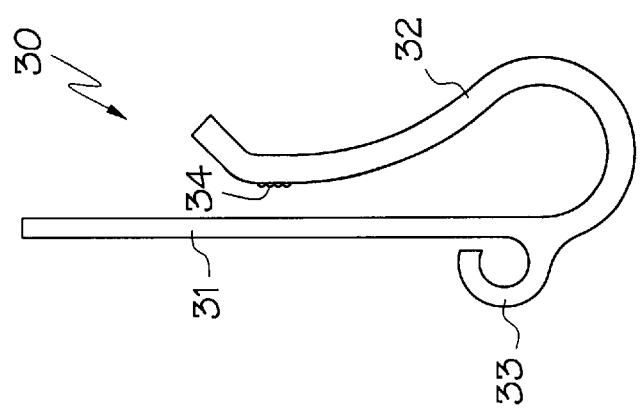
FIG. 6 is a side elevational view of an alternative clip member.

A preferred clip member is shown in FIG. 6. The clip member 30 has a front elongated leg 31. The leg 31 is substantially straight with a substantially flat backside which aids in the clip member 30 sliding vertically along the vehicle's sun visor without undue effort. A back elongated leg 32 is generally S-shaped. The S-shaped back elongated leg is preferred in that it provides a relatively wide mouth area at its top terminus for easier initial placement on the sun visor and a more narrow mid-section to grip the sun visor once properly positioned. A hook-like arm 33 extends from a front face of a lower terminus of the front elongated leg 31. Horizontally extending ridges 34 are provided on the back elongated leg 32 in the narrowed mid-section thereof where contact with the vehicle's sun visor occurs.

Figure 8:
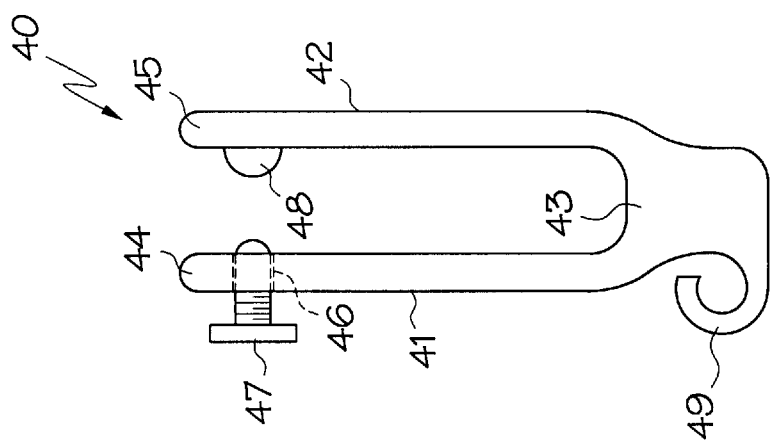
FIG. 8 is a side elevational view of the clip member of FIG. 7.
Figure 7:
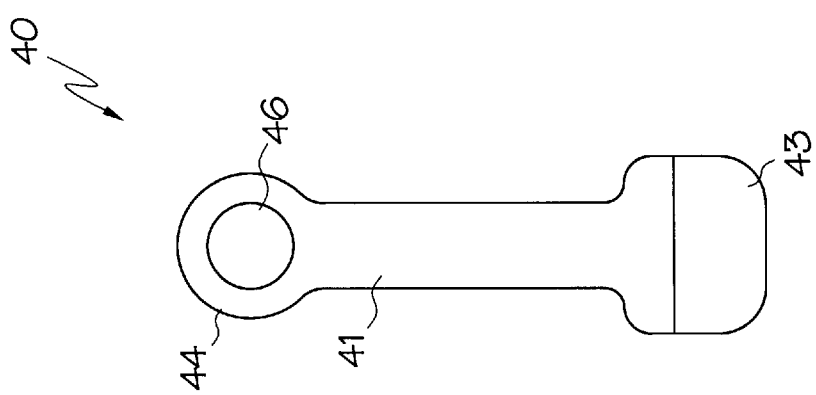
FIG. 7 is a front view of a stream-lined clip member.

FIGS. 7 and 8 illustrate an alternative stream-lined clip member 40. The clip member 40 has two narrow elongated legs 41 and 42 which are joined by a connecting leg 43 to form a U-shaped structure. With reference to FIG. 7, an upper terminus of each elongated leg is flared out to form a circular-shaped front head 44 and a circular-shaped back head 45 when viewed from the front. The front head 44 has a threaded hole 46 extending fully through a center area and is used to receive a tightening screw 47. The back head 45 has a knob 48 aligned with the threaded hole 46 in the front head 44. The tightening screw 47 and the knob 48 cooperatively hold the clip member 40 to the vehicle's windshield visor 11. A hook-like arm 49, similar in construction and use to the hook-like arm 23 of the clip member 12, extends forwardly from a lower part of the clip member 40. The clip member 40 is desired because of its stream-lined appearance and lesser manufacturing cost due to its reduced raw material usage.

In use, the clip member is forced onto the windshield visor of the vehicle. The glare reducing polymeric sheet element is then slipped over the hook-like arm until the sheet element's slot is fully onto the hook-like arm. The driver can now slide the glare reducing sheet element laterally relative to the clip member or can slide the clip member itself laterally until the glare reducing polymeric sheet element is in position to block out unwanted sun rays, most noticeably in the early morning and late afternoon hours. A final adjustment is made by rotating the glare reducing polymeric sheet element about the hook-like arm until the sun rays are fully blocked out and maximum road viewing is retained. Because the clip member need not be moved, the driver can adjust the glare reducing polymeric sheet's position with one hand while the other hand is on the motor vehicle's steering wheel.

Proper use of the motor vehicle's windshield visor and the supplemental sun shield of the invention significantly prevents problems associated with sun glare such as eye fatigue, eye discomfort and vision impairment. Bright light glare from another vehicle is also alleviated by use of the supplemental sun shield. Normal operation of the vehicle's visor is not affected. The windshield visor can be approximately positioned and the supplemental sun shield precisely positioned to accomplish its function. When no longer needed because of a change of travel direction or sun position, the glare reducing polymeric sheet element is rotated upwardly until it is flat with the vehicle's windshield visor.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A supplemental sun shield for use on a front windshield visor of a motor vehicle wherein the front windshield visor only partially blocks out sun rays shining through a front windshield of the motor vehicle with unblocked sun rays shining into the eyes of an occupant in the motor vehicle's front seat, said supplemental sun shield comprising:

(a) a clip member for adjustably mounting on the front windshield visor of the motor vehicle, said clip member having a front elongated leg and a back elongated leg wherein the front and back elongated legs are connected at lower terminuses and further wherein at least one of the two elongated legs has a gripper means for gripping the front windshield visor and the front elongated leg has a hook-like arm extending therefrom; and (b) a glare reducing polymeric sheet element adjustably positioned on the hook-like arm of the clip member, said glare reducing polymeric sheet element having an upper edge, a lower edge and two side edges and further having a horizontally disposed slot near the upper edge which extends laterally to near each of said side edges, said slot being shaped to fit over the hook-like arm of the clip member to laterally slide thereon and to radially rotate thereon to a desired position and angle, whereby unwanted sun rays are blocked out by the glare reducing polymeric sheet element by laterally positioning the clip member on the front windshield visor and by laterally and rotatably positioning the glare reducing polymeric sheet element on the hook-like arm of the clip member.

2. The supplemental sun shield of claim 1 wherein the two elongated legs of the clip member each has an upper terminus with an inside face and further wherein the gripper means is a set of ridges extending substantially horizontally across each inside face of the elongated legs.

3. The supplemental sun shield of claim 1 wherein one elongated leg of the clip member has a threaded hole extending through an upper terminus thereof and further the gripper means is a screw-type fastener adjustably positioned in the threaded hole for contacting the motor vehicle's windshield visor during use.

4. The supplemental sun shield of claim 1 wherein the two elongated legs of the clip member are spaced from about 0.25 inches to about 0.50 inches apart for vertically adjustable positioning on the motor vehicle's windshield visor.

5. The supplemental sun shield of claim 4 wherein the front elongated leg of the clip member is substantially straight and the back elongated leg is generally S-shaped when viewed from the side.

6. The supplemental sun shield of claim 5 wherein the glare reducing polymeric sheet element is generally rectangular-shaped with a width of from about five inches to about ten inches and a height of from about three inches to about five inches.

7. The supplemental sun shield of claim 6 further wherein the glare reducing polymeric sheet element is tinted with a colorant.

8. The supplemental sun shield of claim 6 wherein the slot in the glare reducing polymeric sheet element has a length of at least about four inches and a width of from about 0.10 inches to about 0.40 inches.

9. The supplemental sun shield of claim 8 wherein the slot of the sheet element extends substantially horizontally to the upper edge of the sheet element and is from about 0.25 inches to about 0.50 inches from said upper edge.

10. The supplemental sun shield of claim 9 wherein the slot has a length of from about four inches to about eight inches and a width of from about 0.15 inches to about 0.30 inches.

11. A supplemental sun shield for use on a front windshield visor of a motor vehicle wherein the front windshield visor only partially blocks out sun rays shining through a front windshield of the motor vehicle with unblocked sun rays shining into the eyes of an occupant in the motor vehicle's front seat at varying eye contact angles depending on the position of the occupant's eyes and the position of the sun, said supplemental sun shield comprising:

(a) a clip member for adjustably mounting on the front windshield visor of the motor vehicle, said clip member having a front elongated leg and a back elongated leg joined at lower terminuses and wherein at least one of the two elongated legs has an upper terminus with a gripper means for gripping the front windshield visor and further having a hook-like arm extending from the lower terminus of the front elongated leg; and (b) a generally rectangular-shaped glare reducing polymeric sheet element adjustably positioned on the hook-like arm of the clip member, said glare reducing polymeric sheet element having an upper horizontal edge, a lower horizontal edge and side vertical edges extending from the upper horizontal edge to the lower horizontal edge and further having a horizontally disposed slot near the upper horizontal edge, said slot extending horizontally across the glare reducing sheet element to within about 0.50 inches of each of the side edges and said slot being shaped to fit over the hook-like arm of the clip member to laterally slide on the clip member and to radially rotate on the clip member to a desired angle, whereby unwanted sun rays are blocked out by the glare reducing polymeric sheet element by laterally positioning the clip member on the front windshield visor, by laterally positioning the glare reducing polymeric sheet element on the clip member and by rotatably positioning the glare reducing polymeric sheet element on the clip member.

12. The supplemental sun shield of claim 11 wherein the two elongated legs of the clip member each has an upper terminus with an inside face and further wherein the gripper means is a set of ridges extending substantially horizontally across each inside face of the elongated legs.

13. The supplemental sun shield of claim 11 wherein one elongated leg of the clip member has a threaded hole extending through an upper terminus thereof and further the gripper means is a screw-type fastener adjustably positioned in the threaded hole for contacting the motor vehicle's windshield visor during use.

14. The supplemental sun shield of claim 11 wherein the glare reducing polymeric sheet element has a width of from about five inches to about ten inches and a height of from about three inches to about five inches.

15. The supplemental sun shield of claim 14 further wherein the slot has a length of at least about four inches.

16. The supplemental sun shield of claim 15 wherein the slot has a length of from about four inches to about eight inches and a width of from about 0.15 inches to about 0.30 inches.

17. The supplemental sun shield of claim 16 wherein the hook-like arm of the clip member is inwardly curved with an opening formed between its terminus and a face of the front elongated leg sufficiently large for allowing the sheet element to fit therebetween and for the slot of the sheet element to fit over hook-like arm for resting thereon.

18. The supplemental sun shield of claim 17 wherein the back elongated leg is generally S-shaped when viewed from the side.

19. The supplemental sun shield of claim 1 wherein the horizontally disposed slot in the glare reducing polymeric sheet element extends across the sheet element to within about 0.50 inches of each of the side edges.

20. A supplemental sun shield for use on a front windshield visor of a motor vehicle for blocking out sun rays shining through a front windshield of the motor vehicle, said supplemental sun shield comprising:

(a) a clip member for adjustably mounting on the front windshield visor of the motor vehicle, said clip member having a front elongated leg and a back elongated leg joined at lower terminuses and wherein at least one of the two elongated legs has an upper terminus with a gripper means for gripping the front windshield visor and further having a hook-like arm extending from the lower terminus of the front elongated leg; and (b) a generally rectangular-shaped glare reducing polymeric sheet element adjustably positioned on the hook-like arm of the clip member, said glare reducing polymeric sheet element having an upper horizontal edge, a lower horizontal edge and vertical side edges with a width of from about five inches to about ten inches and a height of from about three inches to about five inches and further having a horizontally disposed slot near the upper horizontal edge, said slot having a length of from about four inches to about eight inches and a width of from about 0.15 inches to about 0.30 inches and being shaped to fit over the hook-like arm of the clip member to laterally slide on the clip member and to radially rotate on the clip member to a desired angle, whereby unwanted sun rays are blocked out by the glare reducing polymeric sheet element by laterally positioning the clip member on the front windshield visor, by laterally positioning the sheet element on the hook-like arm of the clip member and by rotatably positioning the sheet element on the clip member.

21. The supplemental sun shield of claim 20 wherein the hook-like arm of the clip member is inwardly curved with an opening formed between its terminus and a face of the front elongated leg sufficiently large for allowing the sheet element to fit therebetween and for the slot of the sheet element to fit over the hook-like arm for resting thereon.

\* \* \* \* \*